Figures 1, 2:
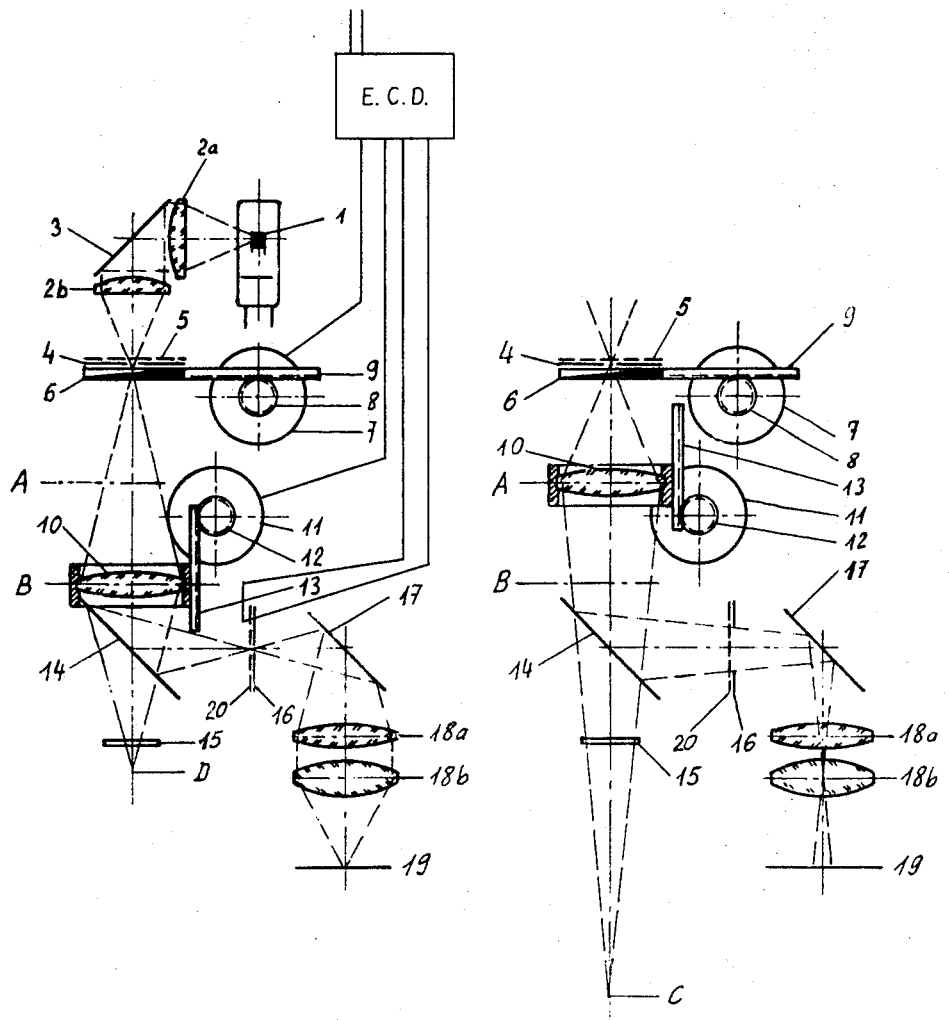

United States Patent

[11] 3,595,147

| [72] | Inventor | Karl Blattner |
| | | Rain 698, Kuttigen Aargall, Switzerland |
| [21] | Appl. No. | 754,908 |
| [22] | Filed | Aug. 23, 1968 |
| [45] | Patented | July 27, 1971 |
| [32] | Priority | Aug. 25, 1967 |
| [33] | | Switzerland |
| [31] | | 12,054/67 |

[54] PHOTOELECTRIC DRAFTING APPARATUS
4 Claims, 2 Drawing Figs.

[52] U.S. Cl. ................................................. 95/12, 355/43
[51] Int. Cl. ................................................. G03b 29/00
[50] Field of Search ..................................... 95/12; 355/19, 43

[56] References Cited
UNITED STATES PATENTS

| 3,205,767 | 9/1965 | Weber | 95/12 X |
| 3,323,414 | 6/1967 | Ritchie | 95/12 |

Primary Examiner—John M. Horan
Attorney—Alvin Browdy

ABSTRACT: The apparatus includes a light source, a first aperture diaphragm and a condenser lens, the lens producing a real image of the aperture upon passing light through the diaphragm, a partially silvered mirror disposed at the rear of the condenser at an angle of 45° to the optical axis thereof to transmit part of the light beam emerging from the condenser lens and to reflect the remaining part of this light beam through an angle of 90°, a second aperture diaphragm to receive the reflected part of the light beam and for determining the thickness of the drawn stroke, a mirror and lens for forming an image of the second aperture on the photographic layer of a photoelectric cell to continuously measure the light intensity and disposed in the path of the light beam which is transmitted by the partially silvered layer which cell controls a servometer for a movable wedge filter which is arranged behind the first aperture diaphragm and which adjusts the light intensity which passes from the aperture of the first diaphragm onto the condenser lens.

INVENTOR.
Karl Blattner
BY Alvin Browdy
Attorney 3,595,147

PHOTOELECTRIC DRAFTING APPARATUS

The present invention relates to a photoelectric drafting apparatus.

Known automatic photoelectric drafting apparatus are controlled by information carriers such as punched cards, punched strips, magnetic tapes or bands and in which an image of the aperture of an aperture diaphragm which is arranged on the work carriage of the apparatus, this aperture being irradiated by a light source, is formed on a photographic layer. In the course of movement of the work carriage the desired stroke or line is formed on the photographic layer. In order to enable strokes or lines of differing thickness to be recorded on the photographic layer, a revolving diaphragm, a drum diaphragm, or an iris diaphragm can be provided instead of a simple aperture diaphragm. Symbols such as letters, numerals, mathematical symbols and the like are recorded on the photographic layer in the form of an image of the opening of a correspondingly shaped stencil, the work carriage being kept stationary for this purpose.

In the known apparatus there is provided a condenser lens, which focuses a beam from a light source on to the plane of the aperture diaphragm and is constructed as an optical member which is positioned in stationary manner in the path of the radiation. For producing a variety of stroke or line thicknesses it is necessary to employ aperture diaphragms the diameters of which vary in the ratio of 1:40. The construction and arrangement of the condenser lens must be so selected that the aperture diaphragms always receive sufficient light, including those with relatively large aperture diameter. As a result when the smaller diaphragms are used the maximum intensity of the light beam is far from being obtained and a large part or a greater part of the light is intercepted by the opaque part of the aperture diaphragms and is thus lost. In the known apparatus the light intensity if constant along the path followed by the light beam. This results in a number of disadvantages. During exposure of the photographic layer for the purpose of drawing a line, the speed of drawing being constant, the light intensity used for forming an image of the aperture must vary approximately as the linear reciprocal of the thickness of the stroke (line). Thus, thin lines need a relatively great light intensity and thick strokes a relatively small light intensity. It follows from this that, as a result of the large light losses entailed by the use of aperture diaphragms of small diameter, that is to say when thin lines are being drawn, the resulting light intensity of the light beam which acts on the photographic layer is not sufficient, even when a very efficient light source is used, so that the smallest stroke thickness which can be satisfactorily obtained is unduly large.

The illumination required for the satisfactory exposure of the photographic layer not only depends on the required thickness of stroke, that is to say on the specific diameter, but also on the speed at which the work carriage of the drafting machine or the like moves (this speed $v=v_x^2+v_y^2$). It is therefore necessary to be in a position to vary the intensity of the light beam acting on the photographic layer, for example by means of a neutrally absorbent wedge filter. The hitherto known apparatus comprise a relatively accurate wedge filter having a linear absorption factor characteristic, this wedge filter being movable by a stepping motor which is controlled according to a program. However it is extremely difficult to attain the necessary accuracy of the wedge filter with regard to the linearity of its absorption factor. If, however, the instantaneous brightness of the light beam falling on the photographic layer is not sufficiently accurately matched to the instantaneous speed of drawing (drafting), then errors in exposure occur which take the form of variations in the thickness of the strokes being recorded, these errors naturally being more prominent in the case of relatively thin strokes or lines than in the case of relatively thick strokes or lines. As is known, the reason for this phenomenon resides in the diffusion of the cone-shaped light beam which produces the stroke and also in the reflection of light from the interfaces (air–emulsion carrier–antihalation protective layer–air) which have different refractive indices.

The invention seeks to eliminate the drawbacks of the known apparatus.

According to the present invention there is provided an apparatus for automatically controlling the exposure of an aperture diaphragm which is arranged on the work carriage of an automatic, photoelectric drafting machine or the like, in which an image of the aperture diaphragm is formed for the purpose of drawing a stroke on to a photographic layer, the apparatus comprising a light source, a first aperture diaphragm and a condenser lens, the lens producing a real image of the aperture upon passing light through the diaphragm a partially silvered mirror disposed at the rear of the condenser lens at an angle of 45° to the optical axis thereof to transmit part of the light beam emerging from the condenser lens and to reflect the remaining part of this light beam through an angle of 90°; a second aperture diaphragm to receive the reflected part of the light beam, said second aperture diaphragm determining the thickness of a stroke to be drawn; mirror and lens means for forming an image of said second aperture on the photographic layer, a photoelectric cell disposed in the path of the light beam which is transmitted by the partially silvered mirror to continuously measure the light intensity of the light beam and control, through the intermediary of an electronic control device, a servometer for a movable wedge filter which is arranged behind the first aperture diaphragm and which adjusts to a prescribed value the light intensity of the light beam which passes from the aperture of the first aperture diaphragm on to the condenser lens.

In an apparatus of this kind the control of the irradiation of the aperture diaphragm takes place automatically and with very great accuracy in accordance with the thickness of stroke required at any given time and in accordance with the speed of drawing, so that errors of exposure and their consequences are prevented to a great extent.

The invention will be described further, by way of example, with reference to the accompanying drawings, in which:

FIG. 1 is a side elevational view of an apparatus according to the invention, adjusted for drawing thin strokes, and FIG. 2 is a side elevational view of this apparatus when adjusted for drawing thick strokes.

All parts of the apparatus shown in the drawings are arranged or mounted on a work carriage of an automatic, photoelectric drafting machine or the like which is not shown.

A light source 1 of constant luminous intensity irradiates an aperture diaphragm 4, through the intermediary of a condenser lens system 2a, 2b which comprises two mutually perpendicularly arranged optical lenses 2a and 2b, between which a mirror 3 is arranged at an angle of 45°. A shutter 5 may, as illustrated, be arranged in front of the aperture diaphragm 4. A wedge filter 6 is arranged behind the aperture diaphragm 4 and is shiftably guided in a guide lying parallel to the aperture diaphragm 4. The wedge filter 6 is adjustable by means of an electric servometer 7 which is controlled in a manner to be described below. A pinion gearwheel 8 mounted on the shaft of the servometer engages a toothed rack 9 mounted on the wedge filter 6. A second condenser lens 10 is mounted to the rear of the wedge filter. Lens 10 is coaxial with the lens 2b and is shiftably guided in a guide which is coaxial with the optical axis of the lens 2b. For this second, shiftable condenser lens 10 there is provided an electrical servometer 11 and a pinion gearwheel 12 is mounted on the shaft of the servometer 11 to engage a toothed rack 13 secured to the housing of the condenser lens 10. This servometer 11 is controlled in a manner to be described below by an electronic program control device of the drafting machine or the like. The condenser lens 10 produces a real image of the aperture of the aperture diaphragm 4, the position of this image moving from plane C to plane D in the course of the movement of the condenser lens 10 from its end position A into its other end position B. Behind the condenser lens 10 there is arranged a partially silvered mirror 14 at an angle of 45° to the optical axis of the condenser lens 10. The mirror 14 reflects, through an angle of 90°, the portion of the light beam which leaves the condenser lens 10 and which is required for the formation of the desired image. A photoelectric cell 15, which lies directly in front of the plane D and in the path of that portion of the light beam which is transmitted by the partially silvered mirror 14, continuously measures the intensity of the beam of light and controls, by way of an electric control device which is not shown, the servometer 7 which actuates the wedge filter 6. The prescribed value of the light intensity of the beam of light which falls on the photoelectric cell 15 is continuously calculated by a computer, which takes into consideration the drawing speed at the material moment of time, and compensates the deviation of the light intensity effective on the photoelectric cell 15 from its prescribed value by means of control pulses which are emitted by the photocell 15 and passed to electronic control device of the servometer 7 for the wedge filter 6, so that the servometer 7 shifts the wedge filter 6 until the photoelectric cell 15 is irradiated with the prescribed light intensity. In this arrangement it is not necessary that the shape of the absorption factor characteristic of the wedge filter 6 should be strictly linear. It will suffice if the wedge filter 6 does not exhibit too great absorption differences within the optical range used, and if the absorption gradient does not change sign within the range which is used. This is relatively easy to realize in practice.

That part of the light beam leaving the condenser lens 10 which is reflected by the partially silvered mirror 14 falls upon the aperture of a rotary drum diaphragm, or iris diaphragm 16 which is located the same distance from the condenser lens 10 as the plane D, with respect to their optical path lengths. An image of the aperture of the rotary drum diaphragm or iris diaphragm is formed, by way of a mirror 17 arranged parallel to the partially silvered mirror 14, and an objective lens system comprising lenses 18a and 18b, on a photolayer 19 applied to a carrier (for example a glass plate, or a transparent foil), which is mounted on and fixed to a drawing table of the drafting machine or the like. The diameter of the aperture of the rotary drum diaphragm or iris diaphragm 16 determines in each case the thickness of the stroke which will be recorded on the photographic layer 19. This rotary drum diaphragm or iris diaphragm 16 is adjustable by the above-mentioned program control device of the drafting machine or the like in synchronism with the movement of the shiftable condenser lens 10 in such a manner that the diameter of the aperture of this diaphragm will always determine the thickness of the stroke as required at any given time. At the same time the simultaneously occurring and accurately determined movement of the condenser lens 10 ensures that it is only the aperture of the diaphragm 16 which is irradiated with light, so that the aperture receives the whole of the available light, no light being intercepted, and thus lost, by the light-impermeable (opaque) part of the rotary drum diaphragm or iris diaphragm 16.

Associated with each diaphragm aperture of the rotary drum diaphragm or iris diaphragm is a neutrally absorbent wedge filter 20, whose absorptive capacity increases with the size of the diaphragm aperture. The wedge filters are provided in order to prevent—in particular with a large diaphragm aperture of the rotary drum diaphragm or iris diaphragm 16, that is to say when strokes of relatively large thickness are being drawn—overexposure of the photographic layer 19 and to errors brought about by such overexposure, for example strokes with poorly defined edges, excessively thick strokes. When a rotary drum diaphragm or iris diaphragm 16 is used, these wedge filters 20 can be arranged directly in front of each diaphragm aperture. If an iris diaphragm 16 is used then it will be found convenient to use a rotatably mounted circular wedge filter 19 which, in dependence on the movement of the iris diaphragm 16, is rotated by the programmed control device of the drafting machine or the like.

FIG. 1 illustrates the apparatus when adjusted for drawing thin strokes, that is to say when the smallest aperture of the rotary drum diaphragm or iris diaphragm 16 is used. Under these circumstances the displaceable condenser lens 10 has been moved into its position B. In FIG. 2, on the other hand, the apparatus is shown when adjusted for drawing a thick line or stroke, that is to say when the largest aperture of the rotary drum diaphragm or iris diaphragm 16 is being used. In this case the displaceable condenser lens 10 has been shifted to end position A.

A spectrally selective partially silvered mirror 14 may also be used which transmits the long wavelength components of the light which falls sn it. The long wavelength components of the light which is thus transmitted by the partially silvered mirror 14 are not used for irradiating the photographic layer but serve to illuminate the photoelectric cell 15, whereas the short wavelength components of the light which are reflected by the partially silvered mirror 14 serve to irradiate the photographic layer 19.

I claim:

1. An apparatus for automatically controlling the exposure of an aperture diaphragm which is arranged on the work carriage of an automatic, photoelectric drafting machine or the like, in which an image of the aperture diaphragm is formed for the purpose of drawing a stroke on to a photographic layer, the apparatus comprising: a light source, a first aperture diaphragm and a condenser lens, the lens producing a real image of the aperture upon passing light through the diaphragm, a partially silvered mirror disposed at the rear of the condenser lens at an angle of 45° to the optical axis thereof to transmit part of the light beam emerging from the condenser lens and to reflect the remaining part of this light beam through an angle of 90°; means to determine the thickness of a drawn stroke comprising a second aperture diaphragm to receive the reflected part of the light beam; mirror and lens means for forming an image of said second aperture on the photographic layer; a photoelectric cell disposed in the path of the light beam which is transmitted by the partially silvered mirror to continuously measure the light intensity of the light beam and control, through the intermediary of an electronic control device; means to adjust to a prescribed value the light intensity of the light beam which passes from the aperture of the first aperture diaphragm on to the condenser lens comprising a servometer for a movable wedge filter which is arranged behind the first aperture diaphragm.

2. Apparatus according to claim 1, in which the second aperture diaphragm is continuously adjustable by a programmed control device of the drafting machine or the like in accordance with the stroke thickness required at any given time, and the condenser lens which forms an image of the first aperture diaphragm is movable in a guide along its optical axis by a servomechanism which is controlled by the said programmed control device of the drafting machine, synchronously with the movement of the rotary diaphragm, drum diaphragm or iris diaphragm, to bring the lens into a position such that the light reflected by the partially silvered mirror falls wholly upon the aperture of the rotary diaphragm, drum diaphragm or iris diaphragm.

3. Apparatus according to claim 1, in which the partially silvered mirror discriminates between the different wavelengths of the light incident thereon and transmits the long wavelength light components.

4. Apparatus in accordance with claim 2 in which a device for regulating the quantity of light falling upon the aperture of said second aperture diaphragm in agreement with the size of this aperture is located before said second diaphragm.